Sept. 18, 1962 W. KAFKA 3,054,945

POWER SUPPLY CONTROL APPARATUS

Filed Sept. 23, 1959

INVENTOR
Wilhelm Kafka
BY [signature]
ATTORNEY 3,054,945

POWER SUPPLY CONTROL APPARATUS

Wilhelm Kafka, Tennenlohe, near Erlangen, Germany, assignor to Siemens-Schuckertwerke Aktiengesellschaft, Erlangen, Germany, a corporation of Germany Filed Sept. 23, 1959, Ser. No. 841,790
Claims priority, application Germany Sept. 27, 1958
5 Claims. (Cl. 323—89)

Figures 1, 5:
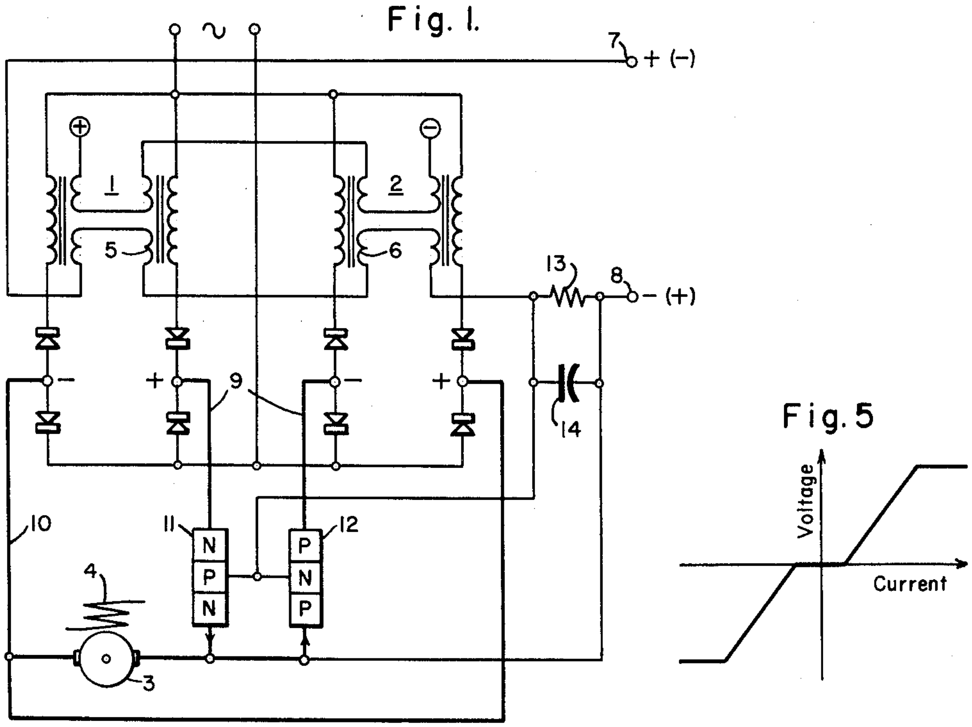

The present invention relates to reversible power supply control apparatus for operation with a load, and more particularly magnetic amplifier control apparatus for providing reversible direct current energization of a load device.

It is well known in the prior art that the ohmic coupling of a single load to magnetic push-pull amplifiers is likely to result in considerable power losses in the resistances which are required for the coupling network. Where a load cannot be split into two parts, as is generally the case, for example, with the excitation winding of electric machines, it has already been proposed to eliminate the coupling resistors by providing batteries as countervoltage sources. In practical operation, these sources of countervoltage are the cause of considerable trouble, however, so that even the power losses in the resistances and the consequent excessive dimensions of the magnetic amplifiers are sometimes preferable. Apart from the fact that such magnetic amplifiers require more space and are quite heavy, they require generally also more control power even though the load receives only a fraction of the controlled power.

It is one of the principal objects of the present invention to eliminate these disadvantages of the magnetic push-pull amplifier circuits known in the art. In accordance with the present invention the output of an instantaneously blocked magnetic amplifier is disconnected from the load or bridged by an electronic switch, particularly a solid state semiconductor switch, such as a transistor or a switching diode, which switch is controlled by the operation of the magnetic amplifier. In the embodiment of the invention to be described, the electronic switch has the function of permitting a predetermined one of two push-pull operative magnetic amplifiers controlled in the desired sense to influence the load, and of disconnecting the other magnetic amplifiers from the load circuit.

Particularly suitable for the purposes of the invention are the known switching transistors which today can be made for considerable saturation currents in the order of several amperes, and for cutoff voltages of several hundred volts. It is known that such a switching transistor is operated only in either one of its cutoff condition or in its saturated condition. In the cutoff condition of the switching transistor, its resistance is very high while in the saturated condition of said transistor, its resistance is practically negligible. The change between these two conditions is effected as rapidly as possible in order to avoid excessive heating of the transistor.

It is essential that in its saturated condition, the transistor will not affect the current flowing therethrough. Therefore, said current may have any value between zero and the value of the maximum saturation current of the transistor without the power loss being excessive and objectionable since, in any event, the voltage drop across the transistor will be negligibly small.

The invention uses this characteristic to advantage by causing the value of the current permitted to flow through the transistor to be determined by the magnetic amplifier that is in operation. Therefore, it is no longer necessary to resort to a two-point control of the switching transistor, since the control range of said transistor may be gradually changed through the magnetic amplifier itself.

Although the invention employs two different control means which must be selected corresponding to the size of the load, a considerable decrease of the required expenditure nevertheless is obtained as compared to previously known devices since now the magnetic amplifier circuit and components need only be rated in dependence on the size or capacity of the load. Each electronic switch is small, inexpensive and of light weight as compared to the magnetic amplifiers. Furthermore, the needed control signal power is no longer excessively high since the electronic switch requires relatively little control energy.

The drawing schematically shows two embodiments of the invention which will now be described in detail. For the sake of clarity, all circuit elements have been omitted in the drawing which are not necessary for a clear understanding of the invention.

Figure 2:
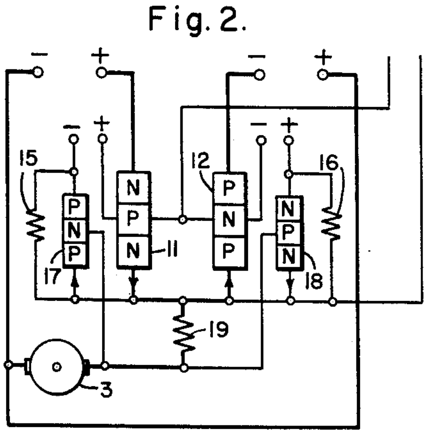
Figure 3:
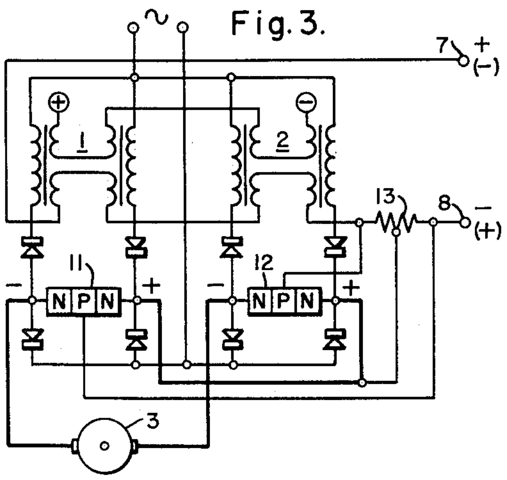
Figure 4:
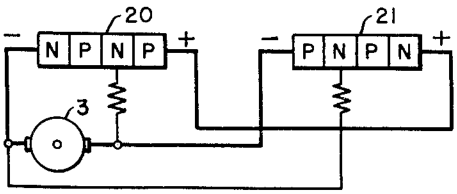

In FIG. 1 there is shown an embodiment of the present control apparatus in accordance with this invention;

In FIG. 2 there is shown a modification of this control apparatus;

In FIG. 3 there is shown a further modification of the present control apparatus; and, In FIG. 4 there is shown another form of the present control apparatus.

In FIG. 5 there is shown the voltage-current characteristic of the magnetic amplifiers of FIGURES 1–4.

FIGURE 1 shows two magnetic amplifiers 1 and 2 connected in a single-phase bridge circuit relation, said magnetic amplifiers 1 and 2 functioning as a push-pull amplifier circuit to supply energy to a D.C. load 3, such as the armature of a D.C. motor. The motor may have an excitation winding 4.

The two magnetic amplifiers 1 and 2 are adapted to to be controlled by a common control circuit including control windings 5 and 6, said control circuit being connected through terminals 7 and 8 to a source of control current and of reversible polarity. The magnetic amplifiers may also be provided with bias and feedback windings, as is well known to persons skilled in this particular art. The output terminals of different polarity of the two magnetic amplifiers 1 and 2 are interconnected by conductors 9 and 10. Connected in circuit with the conductor 9 are two switching transistors 11 and 12 connected in series with each other. The load is connected between a common point between said transistors and said other conductor 10. It is desirable to use transistors of different types of conductivity so that the emitters of the two transistors can be interconnected as shown.

The latter transistors are controlled in dependence upon the control circuit current of the magnetic amplifiers 1 and 2, said control being effected, for example, by deriving through a resistor 13 in the control-current circuit corresponding signals for the base electrodes of the two transistors 11 and 12. It is to be noted that these signals should be of a magnitude which will ensure a full saturation or full cutoff of the transistors 11 and 12 at a small value of the control circuit current, and which, on the other hand, will not subject the transistor to an overload at maximum control current. This can be accomplished, for example, by using a resistor 13 having a nonlinear current-voltage characteristic. Since the transistors require considerably less time to respond to a control signal variation than the magnetic amplifiers, it may be desirable to build a time delay into their control so as to obtain a response time thereof, possibly corresponding to that of the magnetic amplifier. For this purpose, a capacitor 14 may be connected in parallel to the resistor 13.

The mode of operation of the arrangement described hereinbefore relative to FIGURE 1 is as follows. Depending upon the direction of the control current, either the one or the other of said magnetic amplifiers 1 and 2 furnishes an output D.C. voltage which is applied to the load 3. For this purpose, the corresponding switching transistor is saturated and made conductive, whereas the transistor associated with the other magnetic amplifier is cutoff. This prevents short circuiting of the output voltage of the one magnetic amplifier through the other magnetic amplifier, and the system as a whole operates as if there were present only one such amplifier furnishing an output signal of the desired direction. However, the output current of said magnetic amplifier may also be used to supply the cutoff transistor associated with the other magnetic amplifier, while the saturated transistor associated with the magnetic amplifier furnished said output current is saturated (rendered conductive) by a small basic current. By quickly shifting the operating point of the magnetic amplifier to a lower control level, the motor voltage in the motor circuitry shown in FIG. 1 may be higher than the supply voltage supplied by the magnetic amplifier so that the motor current tends to reverse and the motor tends to brake electrically. However, the other transistor still blocks the current path in the other direction. It is then desirable to make the control of the transistors dependent upon the motor current, for example, by causing the previously cutoff transistor to be rendered conductive as soon as the motor current passes through zero.

Provisions may be made if desired to cause the voltage drop across a shunt impedance device provided in the motor circuit to additionally influence the transistors through auxiliary transistors or through a reversing transformer. An embodiment of the invention incorporating this feature is shown in FIG. 2 which supplements FIG. 1. The resistor in the motor circuit is indicated at 19. By connecting resistors 15 and 16, respectively, in parallel to the auxiliary transistors 17 and 18, both main transistors 11 and 12 are caused to be conductive when the motor current is zero and the magnetic amplifier currents are small, so that the motor current may build up in the reverse direction also with very well blocking magnetic amplifier rectifiers. This circuitry also prevents inductances in the load circuit from producing overvoltages at the transistors.

FIG. 3 shows an alternative arrangement of electronic switches according to the present invention. Identical switching elements are provided with the same reference numerals as in FIG. 1. The essential difference between the arrangement shown in FIG. 3 and that illustrated in FIG. 1 resides in that the transistors 11 and 12 (which in the figure arrangement may be of the same type of conductivity) are connected in parallel relation to the output terminals of the magnetic amplifiers 1 and 2. For example, if with a certain direction of the control current, the magnetic amplifier 1 is conductive, the switching transistor 11 will be cut off in order to prevent the latter magnetic amplifier from being short circuited, and the transistor 12 will be conductive to provide a bridging current path parallel to said magnetic amplifier 2. Conditions are reversed when the magnetic amplifier control current flows in the other direction. A time delay of the transistor control may be provided also in the arrangement shown in FIG. 3, or said control may be rendered dependent upon the output current of the magnetic amplifier or upon the current flowing through the load, as may be desired.

Also, the transistors 11 and 12 may be replaced with other semiconductor electronic switches capable of controlling the power supplied to the load. For example, there may be used switching diodes, such as a Dynistor switch device, or switching triodes of known types, such as a Trinistor switch device, provided provisions are made to ensure that the fired switching diode will be extinguished in a suitable manner upon a reversal in the direction of the magnetic amplifier control current or of the load current.

The control of switching triodes may be effected, for example, with an arrangement similar to that shown in FIG. 3. The necessary modifications are indicated in FIG. 4. The magnetic amplifiers will have characteristics as shown in FIG. 5. There then a slow reversal will result in a time interval during which there is no current flow, and during which the switching triodes 20 or 21 will automatically become nonconductive. Upon a rapid reversal, the electromotive force of the motor will reverse the current in the previously fired switching triode, causing the latter to be also cutoff. Thus, it is only necessary to fire said switching triode as soon as the other magnetic amplifier supplies voltage, which can be achieved by means of the circuitry illustrated in FIG. 4. There may also be connected in circuit an intermediate amplifier or an impulse transformer having a core with a rectangular hysteresis loop.

The particular construction of the magnetic amplifier circuit is unimportant for practicing the invention. The single-phase bridge connection may also be replaced with known three-phase connections.

I claim as my invention:

1. In power control apparatus operative with a load device, the combination of a first magnetic amplifier device, a second magnetic amplifier device, each of said magnetic amplifier devices having a load winding operative with said load device and a control winding, an external source of control signal operative with said control windings, a first switch device operative with the load winding of said first magnetic amplifier device, a second switch device operative with the load winding of said second magnetic amplifier device, and a control signal sensing device operative with at least one of said control winding and connected to at least one of said switch devices for controlling the conduction by said one switch device.

2. In power control apparatus operative with a load device, the combination of a first magnetic amplifier device, a second magnetic amplifier device, each of said magnetic amplifier devices having a load winding operative with said load device and a control winding, an external source of control signal operative with said control windings, a first switch device operative with the load winding of said first magnetic amplifier device, a second switch device operative with the load winding of said second magnetic amplifier device, and a control signal sensing device operative with at least one of said control windings and connected to at least one of said switch devices for controlling the conduction by said one switch device, with said first and second magnetic amplifier devices being connected for push-pull energization of said load device, and with said control windings being connected in series to said control signal source.

3. In power control apparatus operative with a load device, the combination of a first magnetic amplifier device, a second magnetic amplifier device, each of said magnetic amplifier devices having a load winding operative with said load device and a control winding, an external source of control signal operative with said control windings, a first switch device operative with the load winding of said first magnetic amplifier device, a second switch device operative with the load winding of said second magnetic amplifier device, and a control signal sensing device operative with at least one of said control windings and connected to at least one of said switch devices for controlling the conduction by said one switch device, with said first and second switch devices being transistors of different conductivity types respectively, and with said control signal sensing device being commonly connected to a control element of each of said transistors.

4. In power control apparatus operative with a load device, the combination of a first magnetic amplifier device, a second magnetic amplifier device, each of said magnetic amplifier devices having a load winding operative with said load device and a control winding, an external source of control signal operative with said control windings, a first switch device operative with the load winding of said first magnetic amplifier device, a second switch device operative with the load winding of said second magnetic amplifier device, and a control signal sensing device operative with at least one of said control windings and connected to at least one of said switch devices for controlling the conduction by said one switch device, with said control signal sensing device including a time delay member for effecting a predetermined time delay in the control of said one switch device substantially corresponding to the response time of at least one of said first and second magnetic amplifier devices.

5. In power control apparatus operative with a load device, the combination of a first magnetic amplifier device, a second magnetic amplifier device, each of said magnetic amplifier devices having a load winding operative with said load device and a control winding, an external source of control signal operative with said control windings, a first switch device operative with the load winding of said first magnetic amplifier device, a second switch device operative with the load winding of said second magnetic amplifier device, and a control signal sensing device operative with at least one of said control windings and connected to at least one of said switch devices for controlling the conduction by said one switch device, with said first and second magnetic amplifier devices being connected for push-pull energization of said load device, and with said control windings being connected in series to said control signal source, with said first and second switch devices being transistors of respectively opposite conductivity types, and with said control signal sensing device being commonly connected to an operation controlling element of each of said transistors.

References Cited in the file of this patent

UNITED STATES PATENTS

| | | |
|---|---|---|
| 2,740,086 | Evans et al. | Mar. 27, 1956 |
| 2,798,904 | Alexanderson | July 9, 1957 |